(12) United States Patent
Chao

(10) Patent No.: US 6,830,811 B2
(45) Date of Patent: Dec. 14, 2004

(54) METHOD OF PREPARING HYDROPHOBIC PARTIALLY AGGREGATED COLLOIDAL SILICA

(75) Inventor: Timothy Chi-Shan Chao, Midland, MI (US)

(73) Assignee: Dow Corning Corporation, Midland, MI (US)

(*) Notice: Subject to any disclaimer, the term of this patent is extended or adjusted under 35 U.S.C. 154(b) by 0 days.

(21) Appl. No.: 10/264,129

(22) Filed: Oct. 2, 2002

(65) Prior Publication Data

US 2004/0067361 A1 Apr. 8, 2004

(51) Int. Cl.[7] .............................................. B32B 5/00
(52) U.S. Cl. ...................................................... 428/405
(58) Field of Search .......................................... 428/405

(56) References Cited

U.S. PATENT DOCUMENTS

| | | | |
|---|---|---|---|
| 4,418,165 A | * 11/1983 | Polmanteer et al. | 523/210 |
| 5,597,512 A | 1/1997 | Watanabe et al. | 252/315.6 |
| 6,025,455 A | 2/2000 | Yoshitake et al. | 528/10 |
| 6,051,672 A | 4/2000 | Burns et al. | 528/10 |
| 6,309,477 B1 | * 10/2001 | Shimakura et al. | 148/253 |
| 6,447,589 B2 | * 9/2002 | Sasaki et al. | 106/14.05 |
| 6,572,983 B2 | * 6/2003 | Shimakura et al. | 428/681 |

FOREIGN PATENT DOCUMENTS

EP          1114794 A1     7/2001

OTHER PUBLICATIONS

Europhysics Letters, "Nanosized hairy grains: A model system to understand the reinforcement," J.C. Castaing, C.Allain, P.Auroy, L.Auvray and A.Pouchelon, 36 (2), pp. 153–158, 1996.

American Chemical Society Rubber Division meeting, "Synthesis and Use of Colloidal Silica for Reinforcement in Silicone Elastomers," K.Kwan, D.Harrington, P.Moore, J.Hahn, J.DeGroot, G.Burns, Orlando Florida, Sep. 21–24, 1999.

* cited by examiner

*Primary Examiner*—Margaret G. Moore
(74) *Attorney, Agent, or Firm*—Jim L. De Cesare

(57) ABSTRACT

A method of preparing a hydrophobic partially aggregated colloidal silica, the method comprising reacting (a) a silica sol comprising at least one hydrophilic partially aggregated colloidal silica with (b) an organosilicon compound selected from (i) at least one organosilane having the formula $R^1_a H_b SiX_{4-a-b}$, (ii) at least one organocyclosiloxane having the formula $(R^1_2 SiO)_m$, (iii) at least one organosiloxane having the formula $R^1_3 SiO(R^1 SiO)_n SiR^1_3$, and (iv) a mixture comprising at least two of (i) (ii), and (iii), in the presence of (c) water (d) an effective amount of a water-miscible organic solvent, and (e) an acid catalyst, to produce the hydrophobic partially aggregated colloidal silica and an aqueous phase, wherein $R^1$ is hydrocarbyl or substituted hydrocarbyl; X is a hydrolysable group; a is 0, 1, 2, or 3; b is 0 or 1; a+b=1, 2, or 3, provided when b=1, a+b=2 or 3; m has an average value of from 3 to 10; and n has an average value of from 0 to 10; and the hydrophobic partially aggregated colloidal silica produced by the method.

30 Claims, 1 Drawing Sheet

METHOD OF PREPARING HYDROPHOBIC PARTIALLY AGGREGATED COLLOIDAL SILICA

FIELD OF THE INVENTION

The present invention relates to a method of preparing a hydrophobic partially aggregated colloidal silica and more particularly to a method comprising reacting a silca sol comprising at least one hydrophilic partially aggregated colloidal silica with an organosilicon compound. The present invention also relates to the hydrophobic partially aggregated colloidal silica prepared by the method.

BACKGROUND OF THE INVENTION

Silica fillers are widely used in the rubber industry to reinforce various silicone and organic elastomers. These fillers improve the mechanical properties, for example, hardness, tensile strength, elongation, modulus, and tear resistance, of the vulcanized rubber. However, finely divided silica fillers, such as colloidal silica, tend to agglomerate and are hard to disperse in uncured elastomer compositions. Consequently, silica fillers are often treated with an organosilicon compound to render the surface hydrophobic. Treatment reduces the tendency of the filler particles to agglomerate and also prevents premature crepe hardening.

Methods of preparing hydrophobic non-aggregated colloidal silica are known in the art. For example, Castaing et al. disclose a method of prepairing nanosized hairy grains by grafting long polydimethylsiloxane chains onto silica particles having a radius of about 15 nm (Europhys. Lett., 1996, 36 (2), 153–158).

Kwan et al. disclose the synthesis of colloidal silica by silylation of an aqueous suspension of colloidal silica with either chlorosilanes or disiloxanes in the presence of acid and isopropyl alcohol, without aggregation of the silica particles (156$^{th}$ ACS Rubber Division Meeting, Orlando, Fla., September 1999, Paper 96).

U.S. Pat. No. 6,025,455 to Yoshitake et al. discloses a process of producing a hydrophobic organosilica sol which comprises aging a reaction mixture at 0 to 100° C. in the state that an alkali present in the reaction mixture is removed or is neutralized with an acid in an equivalent amount or more, thereby forming a silylation-treated silica sol having a hydrophobic colloidal silica dispersed therein, the reaction mixture comprising: (a) a hydrophilic colloidal silica having a specific surface area of 5.5 to 550 m$^2$/g in SiO$_2$ concentration of 5 to 55% by weight, (b) a silylating agent of a disiloxane compound and/or monoalkoxysilane compound in a millimolar ratio of 0.03 to 2 in terms of Si atom per 100 m$^2$ of a surface of the hydrophilic colloidal silica, and (c) a medium, as a residue thereof, comprising a mixed solvent comprising a hydrophobic organic solvent having a solubility of water of 0.1 to 12% by weight and an alcohol having 1 to 3 carbon atoms in a weight ratio of 0.05 to 20 to the hydrophobic organic solvent, and water in an amount of 15% by weight or less based on the weight of the medium.

U.S. Pat. No. 6,051,672 to Burns et al. discloses a method for making hydrophobic non-aggregated colloidal silica comprising reacting an aqueous suspension of a hydrophilic non-aggregated colloidal silica having an average particle diameter greater than about 4 nm with a silicon compound at a pH less than about 4 in the presence of a sufficient quantity of a water-miscible organic solvent to facilitate contact of the hydrophilic non-aggregated colloidal silica with the silicon compound at a temperature within a range of about 20 to 250° C. for a time period sufficient to form a hydrophobic non-aggregated colloidal silica.

Although the aforementioned references describe various methods of producing hydrophobic non-aggregated colloidal silica, they do not teach the method or the hydrophobic partially aggregated colloidal silica of the present invention.

SUMMARY OF THE INVENTION

The present invention is directed to a method of preparing a hydrophobic partially aggregated colloidal silica, the method comprising reacting (a) a silica sol comprising at least one hydrophilic partially aggregated colloidal silica with (b) an organosilicon compound selected from (i) at least one organosilane having the formula $R^1_a H_b SiX_{4-a-b}$, (ii) at least one organocyclosiloxane having the formula $(R^1_2 SiO)_m$, (iii) at least one organosiloxane having the formula $R^1_3 SiO(R^1 SiO)_n SiR^1_3$, and (iv) a mixture comprising at least two of (i) (ii), and (iii), in the presence of (c) water (d) an effective amount of a water-miscible organic solvent, and (e) an acid catalyst, to produce the hydrophobic partially aggregated colloidal silica and an aqueous phase, wherein $R^1$ is hydrocarbyl or substituted hydrocarbyl; X is a hydrolysable group; a is 0, 1, 2, or 3; b is 0 or 1; a+b=1, 2, or 3, provided when b=1, a+b=2 or 3; m has an average value of from 3 to 10; and n has an average value of from 0 to 10.

The present invention is also directed to the hydrophobic partially aggregated colloidal silica produced by the aforementioned method.

The method of the present invention produces hydrophobic partially aggregated colloidal silica in high yield from commercially available starting materials. Moreover, the method can be conveniently controlled to produce hydrophobic silica having a wide range of hydrophobicity, surface area, pore diameter, and pore volume.

The hydrophobic partially aggregated colloidal silica improves the mechanical properties of silicone and organic elastomers (i.e., cross-linked polymers). In particular, a low concentration of the silica imparts excellent mechanical properties, such as durometer hardness, tensile strength, elongation, modulus, and tear strength, to a silicone elastomer compared with hydrophobic non-aggregated colloidal silica. The potential advantages of low silica concentrations include shorter formulation time, lower cost, and lower viscosity.

The hydrophobic silica of the present invention can be used as a reinforcing or extending filler in organic polymer compositions, such as epoxy resins and phenolic resins, and silicone compositions, such as sealants, adhesives, encapsulants, and conformal coatings.

These and other features, aspects, and advantages of the present invention will become better understood with reference to the following description, appended claims, and accompanying drawing.

DETAILED DESCRIPTION OF THE INVENTION

Figure 1:
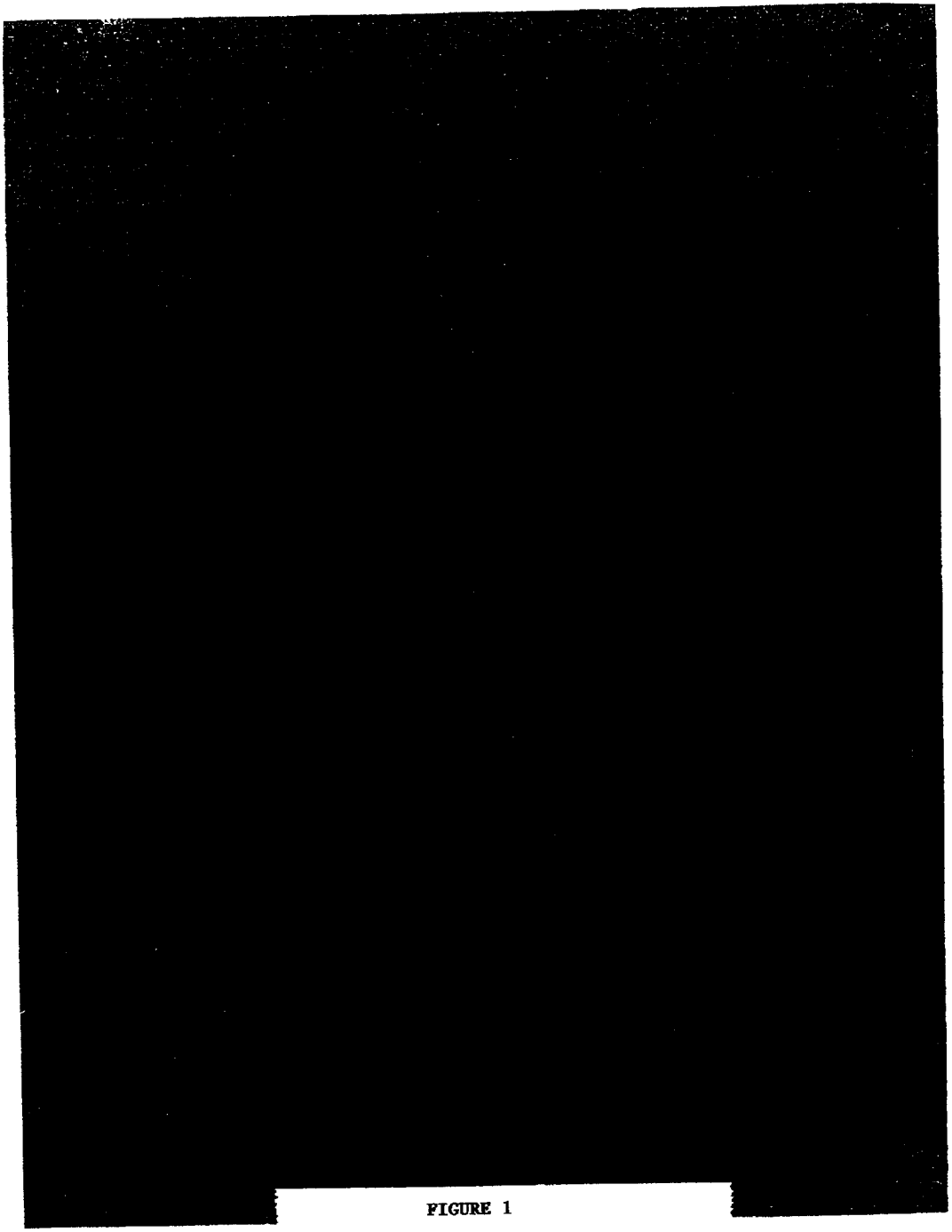
FIG. 1 shows an electron micrograph (TEM, magnification: 100,000) of the hydrophobic partially aggregated colloidal silica of Example 1.

A method according to the present invention of preparing a hydrophobic partially aggregated colloidal silica comprises reacting (a) a silica sol comprising at least one hydrophilic partially aggregated colloidal silica with (b) an organosilicon compound selected from (i) at least one organosilane having the formula $R^1{}_aH_bSiX_{4-a-b}$, (ii) at least one organocyclosiloxane having the formula $(R^1{}_2SiO)_m$, (iii) at least one organosiloxane having the formula $R^1{}_3SiO(R^1SiO)_nSiR^1{}_3$, and (iv) a mixture comprising at least two of (i) (ii), and (iii), in the presence of (c) water (d) an effective amount of a water-miscible organic solvent, and (e) an acid catalyst, to produce the hydrophobic partially aggregated colloidal silica and an aqueous phase, wherein $R^1$ is hydrocarbyl or substituted hydrocarbyl; X is a hydrolysable group; a is 0, 1, 2, or 3; b is 0 or 1; a+b=1, 2, or 3, provided when b=1, a+b=2 or 3; m has an average value of from 3 to 10; and n has an average value of from 0 to 10.

Component (a) is a silica sol comprising at least one hydrophilic partially aggregated colloidal silica. As used herein, the term "silica sol" refers to a stable suspension of hydrophilic partially aggregated colloidal silica particles in water, an organic solvent, or a mixture of water and a water-miscible organic solvent. Also, as used herein, the term "hydrophilic" means the silica surface has silanol (Si—OH) groups capable of hydrogen bonding with suitable donors, such as adjacent silanol groups and water molecules. In other words, the silanol groups produced during manufacture of the silica have not been modified, for example, by reaction with an organosilicon compound. Further, as used herein, the term "partially aggregated colloidal silica" refers to colloidal silica comprising particles having a ratio $D_1/D_2$ of at least 3, where $D_1$ is the mean diameter of the colloidal silica particles measured by a dynamic light-scattering method and $D_2$ is the mean diameter of the colloidal silica particles as determined by a nitrogen adsorption method, and $D_1$ has a value of from 40 to 500 nm. The value of $D_1$ can be determined using a conventional light-scattering apparatus according to the well known method described in J. Chem. Phys. 1972, 57 (11), 4814. The value of D2 can be calculated according to the equation $D_2=2720/S$, where S is the specific surface area of the colloidal silica as determined by nitrogen absorption according to the Brunauer-Emmett-Teller (BET) method. Additionally, aqueous silica sols typically have a pH of from 7 to 11.

Examples of silica sols suitable for use as component (a) include, but are not limited to, a moniliform silica sol disclosed by Watanabe et al. in European Patent Application No. EP 1114794 A1 and an elongated-shaped silica sol disclosed by Watanabe et al. in U.S. Pat. No. 5,597,512. The moniliform (rosary- or pearl necklace-shaped) silica sol has an $SiO_2$ concentration of 1 to 50% (w/w) and contains liquid medium-dispersed moniliform colloidal silica particles having a ratio $D_1/D_2$ of at least 3, wherein the moniliform colloidal silica particles comprise spherical colloidal silica particles having a mean diameter of 10 to 80 nm and metal oxide-containing silica bonding the spherical colloidal silica particles, wherein the spherical colloidal silica particles are linked in rows in only one plane; and $D_1$ and $D_2$ are as defined above, wherein $D_1$ has a value of from 50 to 500 nm. The length of the moniliform colloidal silica particles is typically at least five times the mean-diameter of the spherical colloidal silica particles, as determined by electron micrographs. The silica bonding the spherical colloidal silica particles contains a small amount, 0.5 to 10% (w/w), of a divalent or trivalent metal oxide, based on the weight of $SiO_2$ in the silica bonding the spherical colloidal silica particles, depending on the method of preparing the moniliform silica sol.

The moniliform silica sol typically contains not greater than 50% (w/w), preferably 5 to 40% (w/w), of $SiO_2$. The viscosity of the silica sol is typically from several mPa·s to about 1,000 mPa·s at room temperature.

Examples of moniliform silica sol include the aqueous suspensions of colloidal silica sold by Nissan Chemical Industries, Ltd. (Tokyo, Japan) under the trade names SNOWTEX-PS-S and SNOWTEX-PS-M, described in the Examples section below.

The moniliform silica sol can be prepared as described in detail by Watanabe et al. in European Patent Application No. EP 111 4794 A1. Briefly stated, the method comprises: (a) adding an aqueous solution containing a water-soluble divalent metal salt or a water-soluble trivalent metal salt singly or in admixture to an active silicic acid-containing aqueous colloidal liquid or an acidic silica sol having a mean particle diameter of 3 to 8 nm, each containing 0.5 to 10% (w/w) of $SiO_2$ and having a pH of 2 to 6, in an amount of 1 to 10% (w/w) as a metal oxide based on $SiO_2$ in the aqueous colloidal solution of active silicic acid or acidic silica sol and mixing them; (b) adding acidic spherical silica sol having a mean diameter of 10 to 80 nm and a pH 2 to 6 to the mixed liquid (a) obtained in step (a) in such an amount that a ratio of a silica content (A) derived from the acidic spherical silica sol to a silica content (B) derived from the mixed liquid (b), A/B (weight ratio), is 5 to 100 and the total silica content (A+B) of a mixed liquid (b) obtained by mixing the acidic spherical silica sol with the mixed liquid (a) has an $SiO_2$ concentration of 5 to 40% (w/w) in the mixed liquid (b) and mixing them; (c) adding an alkali metal hydroxide, water-soluble organic base or water-soluble silicate to the mixed liquid (b) obtained in step (b) such that the pH is 7 to 11 and mixing them; and (d) heating the mixed liquid (c) obtained in step (c) at 100 to 200° C. for 0.5 to 50 h.

The elongated-shaped silica sol has an $SiO_2$ concentration of 6 to 30% (w/w) and contains elongated-shaped amorphous colloidal silica particles having a ratio $D_1$/D2 of at least 5, wherein $D_1$ and $D_2$ are as defined above for the moniliform colloidal silica particles and $D_1$ has a value of from 40 to 300 nm; and the particles are elongated in only one plane and have a uniform thickness along the elongation within the range of from 5 to 20 nm, as determined using an electron microscope. The colloidal silica particles are substantially amorphous silica, but they may contain a small amount, typically 1500 to 8500 ppm, of an oxide of calcium or magnesium, or both, based on the weight of $SiO_2$ in the silica sol. In some cases, the silica particles may contain a slight amount of oxides of other polyvalent metals in addition to the oxides of calcium and/or magnesium. The total concentration of metal oxides is typically from 1500 to 15000 ppm, based on the weight of $SiO_2$ in the silica sol. Examples of polyvalent metals include strontium, barium, zinc, tin, lead, copper, iron, nickel cobalt, manganese, aluminum, chromium, yttrium, and titanium.

The elongated-shaped silica sol can be prepared as described in detail by Watanabe et al. in U.S. Pat. No. 5,597,512. Briefly stated, the method comprises: (a) mixing an aqueous solution containing a water-soluble calcium salt or magnesium salt or a mixture of said calcium salt and said magnesium salt with an aqueous colloidal liquid of an active silicic acid containing from 1 to 6% (w/w) of $SiO_2$ and having a pH in the range of from 2 to 5 in an amount of 1500 to 8500 ppm as a weight ratio of CaO or MgO or a mixture of CaO and MgO to $SiO_2$ of the active silicic acid; (b) mixing an alkali metal hydroxide or a water-soluble organic base or a water-soluble silicate of said alkali metal hydroxide or said water-soluble organic base with the aqueous solution obtained in step (a) in a molar ratio of $SiO_2/M_2O$ of from 20 to 200, where $SiO_2$ represents the total silica content derived from the active silicic acid and the silica content of the silicate and M represents an alkali metal atom or organic base molecule; and (c) heating at least a part of the mixture obtained in step (b) to 60° C. or higher to obtain a heel solution, and preparing a feed solution by using another part of the mixture obtained in step (b) or a mixture prepared separately in accordance with step (b), and adding said feed solution to said heel solution while vaporizing water from the mixture during the adding step until the concentration of $SiO_2$ is from 6 to 30% (w/w). The silica sol produced in step (c) typically has a pH of from 8.5 to 11.

Component (a) can be a silica sol comprising a single hydrophilic partially aggregated colloidal silica as described above or a silica sol comprising two or more such colloidal silicas that differ in at least one property, such as surface area, pore diameter, pore volume, particle size, and particle shape.

Component (b) is at least one organosilicon compound selected from (b)(i), (b)(ii), (b)(iii), and (b)(iv), each described below.

Component (b)(i) is at least one organosilane having the formula $R^1_aH_bSiX_{4-a-b}$, wherein $R^1$ is hydrocarbyl or substituted hydrocarbyl; X is a hydrolysable group; a is 0, 1, 2, or 3; b is 0 or 1; and a+b=1, 2, or 3, provided when b=1, a+b=2 or 3. The hydrocarbyl groups and substituted hydrocarbyl groups represented by $R^1$ typically have from 1 to 20 carbon atoms, alternatively from 1 to 10 carbon atoms, alternatively from 1 to 6 carbon atoms. Acyclic hydrocarbyl and substituted hydrocarbyl groups containing at least 3 carbon atoms can have a branched or unbranched structure.

Examples of hydrocarbyl groups include, but are not limited to, alkyl, such as methyl, ethyl, propyl, 1-methylethyl, butyl, 1-methylpropyl, 2-methylpropyl, 1,1-dimethylethyl, pentyl, 1-methylbutyl, 1-ethylpropyl, 2-methylbutyl, 3-methylbutyl, 1,2-dimethylpropyl, 2,2-dimethylpropyl, hexyl, heptyl, octyl, nonyl, decyl, undecyl, dodecyl, tridecyl, tetradecyl, pentadecyl, hexadecyl, heptadecyl, and octadecyl; cycloalkyl, such as cyclopentyl, cyclohexyl, and methylcyclohexyl; aryl, such as phenyl and naphthyl; alkaryl, such as tolyl and xylyl; aralkyl, such as benzyl and phenethyl; alkenyl, such as vinyl, allyl, and propenyl; arylalkenyl, such as styryl and cinnamyl; and alkynyl, such as ethynyl and propynyl.

Examples of substitutents include —OH, —$NH_2$, —SH, —$CO_2H$, —O(O=C)$R^2$, —($R^2$)N(O=)$CR^2$, and —S—S—$R^2$, wherein $R^2$ is $C_1$ to $C_8$ hydrocarbyl.

As used herein, the term "hydrolysable group" The term "hydrolysable group" means the Si—X group can react with water to form an Si—OH group. Examples of hydrolysable groups include, but are not limited to, —Cl, Br, —$OR^3$, —$OCH_2CH_2OR^3$, $CH_3C(=O)O—$, Et(Me)C=N—O—, $CH_3C(=O)N(CH_3)—$, and —$ONH_2$, wherein $R^3$ is $C_1$ to $C_8$ hydrocarbyl or halogen-substituted hydrocarbyl.

Examples of hydrocarbyl groups represented by $R^3$ include, but are not limited to, unbranched and branched alkyl, such as methyl, ethyl, propyl, 1-methylethyl, butyl, 1-methylpropyl, 2-methylpropyl, 1,1-dimethylethyl, pentyl, 1-methylbutyl, 1-ethylpropyl, 2-methylbutyl, 3-methylbutyl, 1,2-dimethylpropyl, 2,2-dimethylpropyl, hexyl, heptyl, and octyl; cycloalkyl, such as cyclopentyl, cyclohexyl, and methylcyclohexyl; phenyl; alkaryl, such as tolyl and xylyl; aralkyl, such as benzyl and phenethyl; alkenyl, such as vinyl, allyl, and propenyl; arylalkenyl, such as styryl; and alkynyl, such as ethynyl and propynyl. Examples of halogen-substituted hydrocarbyl groups include, but are not limited to, 3,3,3-trifluoropropyl, 3-chloropropyl, chlorophenyl, and dichlorophenyl.

Examples of organosilanes include, but are not limited to, $SiCl_4$, $CH_3SiCl_3$, $CH_3CH_2SiCl_3$, $C_6H_5SiCl_3$, $(CH_3)_2SiCl_2$, $(CH_3CH_2)_2SiCl_2$, $(C_6H_5)_2SiCl_2$, $(CH_3)_3SiCl$, $CH_3HSiCl_2$, $(CH_3)_2HSiCl$, $SiBr_4$, $CH_3SiBr_3$, $CH_3CH_2SiBr_3$, $C_6H_5SiBr_3$, $(CH_3)_2SiBr_2$, $(CH_3CH2)_2SiBr_2$, $(C6H_5)_2SiBr_2$, $(CH_3)_3SiBr$, $CH_3HSiBr_2$, $(CH_3)_2HSiBr_3$, $Si(OCH_3)_4$, $CH_3Si(OCH_3)_3$, $CH_3Si(OCH_2CH_3)_3$, $CH_3Si(OCH_2CH_2CH_3)_3$, $CH_3Si[O(CH_2)_3CH_3]_3$, $CH_3CH_2Si(OCH_2CH_3)_3$, $C_6H_5Si(OCH_3)_3$, $C_6H_5CH_2Si(OCH_3)_3$, $C_6H_5Si(OCH_2CH_3)_3CH_2=CHSi(OCH_3)_3$, $CH_2=CHCH_2Si(OCH_3)_3$, $CF_3CH_2CH_2Si(OCH_3)_3$, $(CH_3)_2Si(OCH_3)_2$, $(CH_3)_2Si(OCH_2CH_3)_2$, $(CH_3)_2Si(OCH_2CH_2CH_3)_2$, $(CH_3)_2Si[O(CH_2)_3CH_3]_2$, $(CH_3CH_2)_2Si(OCH_2CH_3)2$, $(C_6H_5)_2Si(OCH_3)_2$, $(C_6H_5CH_2)_2Si(OCH_3)_2$, $(C_6H_5)_2Si(OCH_2CH_3)_2$, $(CH_2=CH)_2Si(OCH_3)_2$, $(CH_2=CHCH_2)_2Si(OCH_3)_2$, $(CF_3CH_2CH_2)_2Si(OCH_3)_2$, $(CH_3)_3SiOCH_3$, $CH_3HSi(OCH_3)_2$, $(CH_3)_2HSiOCH_3$, $CH_3Si(OCH_2CH_2OCH_3)_3$, $CF_3CH_2CH_2Si(OCH_2CH_2OCH_3)_3$, $CH_2=CHSi(OCH_2CH_2OCH_3)_3$, $CH_2=CHCH_2Si(OCH_2CH_2OCH_3)_3$, and $C_6H_5Si(OCH_2CH_2OCH_3)_3$, $(CH_3)_2Si(OCH_2CH_2OCH_3)_2$, $(CF_3CH_2CH_2)_2Si(OCH_2CH_2OCH_3)_2$, $(CH_2=CH_2Si(OCH_2CH_2OCH_3)_2$, $(CH_2=CHCH_2)_2Si(OCH_2CH_2OCH_3)_2$, $(C_6H_5)_2Si(OCH_2CH_2OCH_3)_2$, $CH_3Si(OAc)_3$, $CH_3CH_2Si(OAc)_3$, $CH_2=CHSi(OAc)_3$, $(CH_3)_2Si(OAc)_2$, $(CH_3CH_2)_2Si(OAc)_2$, $(CH_2=CH)_2Si(OAc)_2$, $CH_3Si[ON=C(CH_3)CH_2CH_3]_3$, $(CH_3)_2Si[ON=C(CH_3)CH_2CH_3]_2$, $CH_3Si[NHC(=O)CH_3]_3$, $C_6H_5Si[NHC(=O)CH_3]_3$, $(CH_3)_2Si[NHC(=O)CH_3]_2$, and $Ph_2Si[NHC(=O)CH_3]_2$, wherein OAc is $CH_3C(=O)O—$ and Ph is phenyl.

Component (b)(i) can be a single organosilane or a mixture comprising two or more different organosilanes, each having the formula $R^1_aH_bSiX_{4-a-b}$, wherein $R^1$, X, a, and b are as defined above. Methods of preparing organosilanes suitable for use as component (b)(i) are well known in the art; many of these organosilanes are commercially available.

Component (b)(ii) is at least one organocyclosiloxane having the formula $(R^1_2SiO)_m$, wherein $R^1$ is as defined and exemplified above for component (b)(i) and m has an average value of from 3 to 10, alternatively from 3 to 8, alternatively from 3 to 5.

Examples of organocylclosiloxanes include, but are not limited to, hexamethylcyclotrisiloxane, octamethylcyclotetrasiloxane, and decamethylcyclopentasiloxane.

Component (b)(ii) can be a single organocylcosiloxane or a mixture comprising two or more different organocyclosiloxanes that differ in at least one property, such as structure, viscosity, average molecular weight, siloxane units, and sequence. Methods of preparing organocyclosiloxanes suitable for use as component (b)(ii) are well known in the art; many of these organocyclosiloxanes are commercially available.

Component (b)(iii) is at least one organosiloxane having the formula $R^1_3SiO(R^1SiO)_nSiR^1_3$, wherein $R^1$ is as defined and exemplified above for component (b)(i) and n has an average value of from 0 to 10, alternatively from 0 to 8, alternatively from 0 to 4.

Examples of organosiloxanes include, but are not limited to, hexamethyldisiloxane, hexaethyldisiloxane, 1,3-divinyl-1,1,3,3-tetramethyldisiloxane, octamethyltrisiloxane, and decamethyltetrasiloxane.

Component (b)(iii) can be a single organosiloxane or a mixture comprising two or more different organosiloxanes that differ in at least one property, such as structure, viscosity, average molecular weight, siloxane units, and sequence. Methods of preparing organosiloxanes suitable for use as component (b)(iii) are well known in the art; many of these organosiloxanes are commercially available.

Component (b) can be a single organosilicon compound represented by components (b)(i), (b)(ii), and (b)(iii), or a mixture comprising at least two of the components.

Component (d) is at least one water-miscible organic solvent. As used herein, the term "water-miscible" means the organic solvent is substantially miscible with water or completely miscible (i.e., miscible in all proportions) with water. For example, the solubility of the water-miscible organic solvent in water is typically at least 90 g/100 g of water at 25° C.

Examples of water-miscible organic solvents include, but are not limited to, monohydric alcohols such as methanol, ethanol, 1-propanol, and 2-propanol; dihydric alcohols such as ethylene glycol and propylene glycol; polyhydric alcohols such as glycerol and pentaerythritiol; and dipolar aprotic solvents such as N,N-dimethylformamide, tetrahydrofuran, dimethylsulfoxide, and acetonitrile. Component (d) can be a single water-miscible organic solvent or a mixture comprising two or more different water-miscible organic solvents, each as defined above.

Component (e) is at least one acid catalyst that promotes reaction of the hydrophilic partially aggregated colloidal silica with the organosilicon compound, component (b). Although the acid catalyst is typically added as a separate component to the reaction mixture, in some cases it can be produced in situ. For example, when component (b) is an organosilane containing a hydrolysable group such as chloro, a portion or all of the acid catalyst may be generated by reaction of the chlorosilane with water or the hydroxy groups of the hydrophilic partially aggregated colloidal silica.

Examples of acid catalysts include inorganic acids such as hydrochloric acid, sulfuric acid, nitric acid, and hydrofluoric acid; and organic acids such as acetic acid, oxalic acid, and trifluoroacetic acid. The acid can be a single acid or a mixture comprising two or more different acids.

The method of the present invention can be carried out in any standard reactor suitable for contacting silica with an organosilicon compound in the presence of water and an acid catalyst. Suitable reactors include glass and Teflon-lined glass reactors. Preferably, the reactor is equipped with an efficient means of agitation, such as a stirrer.

The silica sol, component (a), is typically added to a mixture comprising the organosilicon compound, water, the water-miscible organic solvent, and the acid catalyst. Reverse addition, i.e., addition of a mixture comprising the organosilicon compound to the silica sol is also possible. However, reverse addition may result in formation of larger aggregates of the colloidal silica.

The rate of addition of the silica sol to the mixture containing the organosilicon compound is typically from 1 to 3 mL/min for a 0.5-L reaction vessel equipped with and efficient means of stirring. When the rate of addition is too slow, the reaction time is unnecessarily prolonged. When the rate of addition is too fast, the colloidal silica may form larger aggregates.

The suspension of the hydrophilic partially aggregated colloidal silica and the organosilicon compound are typically reacted at a temperature of from 20 to 150° C., alternatively from 40 to 120° C., alternatively from 60 to 100° C.

The reaction is carried out for a period of time sufficient to produce the hydrophobic partially aggregated colloidal silica, and an aqueous phase. The reaction time depends on a number of factors including the nature of the hydrolysable groups in the organosilicon compound, structure of the organosilicon compound, agitation of the reaction mixture, concentration of the hydrophilic partially aggregated colloidal silica, and temperature. The reaction time is typically from several minutes to several hours. For example, the reaction time is typically from 0.1 to 2 h at a temperature of from 40 to 120° C., alternatively from 0.5 to 1 h at a temperature of from 60 to 100° C. The optimum reaction time can be determined by routine experimentation using the methods set forth in the Examples below.

The concentration of the hydrophilic partially aggregated colloidal silica of component (a) in the reaction mixture is typically from 1 to 20% (w/w), alternatively from 1 to 10% (w/w), alternatively from 1 to 5% (w/w), based on the total weight of the reaction mixture.

The mole ratio of the organosilicon compound, component (b), to the hydrophilic partially aggregated colloidal silica ($SiO_2$) of component (a) is typically from 0.1 to 5, alternatively from 0.2 to 3, alternatively from 0.5 to 2. When the mole ratio of component (b) to the hydrophilic partially aggregated colloidal silica is less than 0.1, the treated silica may not exhibit hydrophobic properties. When the mole ratio is greater than 5, the hydrophobic colloidal silica may not precipitate from the aqueous phase, as described below.

The concentration of water, component (c), in the reaction mixture is typically from 20 to 60% (w/w), alternatively from 20 to 50% (w/w), alternatively from 20 to 40% (w/w), based on the total weight of the reaction mixture. When component (a) is an aqueous silica sol, a portion or all of component (c) may be supplied by the silica sol.

The water-miscible organic solvent, component (d), is present in an effective amount in the reaction mixture. As used herein, the term "effective amount" means the concentration of component (d) is such that (i) the organosilicon compound is soluble in the aqueous reaction mixture containing the water-miscible organic solvent, and (ii) the partially aggregated colloidal silica particles in the reaction mixture are stable, i.e., the particles do not form larger aggregates. Aggregation of the hydrophilic partially aggregated colloidal silica particles can be detected by comparing the size and shape of the hydrophobic colloidal silica particles with the size and shape of the hydrophilic partially aggregated colloidal silica particles of component (a) using electron microscopy. The concentration of component (d) is typically from about 5 to about 35% (v/v), alternatively from 10 to 30% (v/v), alternatively from 20 to 30% (v/v), based on the total volume of the reaction mixture. When the concentration of component (d) is less than 5% (v/v), the treated silica may not exhibit hydrophobic properties. When the concentration of component (d) is greater than 35% (v/v), the hydrophobic colloidal silica may not precipitate from the aqueous phase, as described below. The effective amount of component (d) can be determined by routine experimentation using the methods in the Examples below.

The concentration of component (e) is sufficient to maintain the pH of the reaction mixture at a value less than 4. For example, the concentration of component (e) is typically from 10 to 60% (w/w), alternatively from 10 to 40% (w/w), based on the total weight of the reaction mixture. When the concentration of component (e) is less than 10% (w/w), the rate of reaction may be too slow for commercial applications. When the concentration of component (e) is greater than 60% (w/w), additional washing steps may be required to remove the acid from the hydrophobic partially aggregated colloidal silica.

The hydrophobic partially aggregated colloidal silica typically precipitates from the aqueous phase. As used herein, the term "precipitates" means the hydrophobic partially aggregated colloidal silica forms a deposit that is insoluble in the aqueous phase. For example, the hydrophobic colloidal silica may float to the top of the aqueous phase, settle to the bottom of the aqueous phase, or collect on the walls of the reaction vessel. The hydrophobic silica is typically separated from the aqueous phase by removing (for example, draining or decanting) the aqueous phase or the hydrophobic silica.

The hydrophobic silica, isolated as described above, is typically washed with water to remove residual acid. The water can further comprise a water-miscible organic solvent, such as 2-propanol. The concentration of the water-miscible organic solvent in the aqueous wash is typically from 10 to 30% (v/v). The hydrophobic silica can be washed by mixing it with water and then separating the hydrophobic silica from the water. The organic phase is typically washed from one to three times with separate portions of water. The volume of water per wash is typically from two to five times the volume of the hydrophobic partially aggregated colloidal silica.

The washed hydrophobic silica is typically dried by suspending it in a water-immiscible organic solvent and then removing the organic solvent using a process such as evaporating or spray drying. As used herein, the term "water-immiscible" means the organic solvent is slightly miscible or completely immiscible with water. For example, the solubility of water in the solvent is typically less than about 0.1 g/100 g of solvent at 25° C. The organic solvent can be any aprotic or dipolar aprotic organic solvent that is immiscible with water. Preferably, the organic solvent forms a minimum boiling azeotrope with water. If the organic solvent does not form an azeotrope with water, the organic solvent preferably has a boiling point greater than the boiling point of water.

Examples of water-immiscible organic solvents include, but are not limited to, saturated aliphatic hydrocarbons such as n-pentane, hexane, n-heptane, isooctane and dodecane; cycloaliphatic hydrocarbons such as cyclopentane and cyclohexane; aromatic hydrocarbons such as benzene, toluene, xylene and mesitylene; cyclic ethers such as tetrahydrofuran (THF) and dioxane; ketones such as methyl isobutyl ketone (MIBK); halogenated alkanes such as trichloroethane; and halogenated aromatic hydrocarbons such as bromobenzene and chlorobenzene. The water-immiscible organic solvent can be a single organic solvent or a mixture comprising two or more different organic solvents, each as defined above.

Additionally, before removing the water-immiscible organic solvent, as described above, the suspension of the hydrophobic silica in the organic solvent can be distilled to remove water. The distillation can be carried out at atmospheric or subatmospheric pressure at a temperature that depends on the boiling point of the water-immiscible organic solvent. The distillation is typically continued until the distillate is free of water.

Under certain conditions, the hydrophobic partially aggregated colloidal silica remains suspended in the aqueous phase of the reaction mixture. In this case, the aqueous suspension of the hydrophobic silica is typically treated with a water-immiscible organic solvent in an amount sufficient to form a non-aqueous phase comprising the water-immiscible organic solvent and the hydrophobic silica. Suitable water-immiscible organic solvents are described above. The concentration of the water-immiscible organic solvent is typically from 5 to 20% (v/v), alternatively from 10 to 20% (v/v), based on the total volume of the aqueous suspension.

The non-aqueous phase is typically separated from the aqueous phase by discontinuing agitation of the mixture, allowing the mixture to separate into two layers, and removing the aqueous or non-aqueous layer.

The non-aqueous phase, isolated as described above, is typically washed with water to remove residual acid. The water can further comprise a water-miscible organic solvent, such as 2-propanol. The concentration of the water-miscible organic solvent in the solution is typically from 10 to 30% (v/v). The non-aqueous phase can be washed by mixing it with water, allowing the mixture to separate into two layers, and removing the aqueous layer. The organic phase is typically washed from one to three times with separate portions of water. The volume of water per wash is typically from two to five times the volume of the non-aqueous phase.

The hydrophobic silica is typically dried by removing the water-immiscible organic solvent using a method such as evaporating or spray-drying.

Additonally, before removing the water-immiscible organic solvent, the non-aqueous phase can be distilled to remove water. The distillation can be carried out at atmospheric or subatmospheric pressure at a temperature that depends on the boiling point of the water-immiscible organic solvent. The distillation is typically continued until the distillate is free of water. The distillation is typically continued until the distillate is free of water.

The hydrophobic partially aggregated colloidal silica prepared by the method of the present invention typically has a surface area of from 20 to 300 m$^2$/g, alternatively from 50 to 200 m$^2$/g, alternatively from 50 to 150 m$^2$/g, as determined by nitrogen adsorption according to the BET method. Also, the hydrophobic colloidal silica typically has a pore diameter of from 50 to 300 Å, alternatively from 100 to 250 Å, alternatively from 150 to 250 Å; and a pore volume of from 0.5 to 1.5 mL/g, alternatively form 0.5 to 1.0 mL/g, as determined by nitrogen adsorption methods. Moreover, the hydrophobic colloidal silica comprises particles having a size and shape approximating the size and shape of the hydrophilic colloidal silica particles of component (a).

The method of the present invention produces hydrophobic partially aggregated colloidal silica in high yield from commercially available starting materials. Moreover, the method can be conveniently controlled to produce hydrophobic silica having a wide range of hydrophobicity, surface area, pore diameter, and pore volume.

The hydrophobic partially aggregated colloidal silica improves the mechanical properties of silicone and organic elastomers (i.e., cross-linked polymers). In particular, a low concentration of the silica imparts excellent mechanical properties, such as durometer hardness, tensile strength, elongation, modulus, and tear strength, to a silicone elastomer compared with hydrophobic non-aggregated colloidal silica. The potential advantages of low silica concentrations include shorter formulation time, lower cost, and lower viscosity.

The hydrophobic silica of the present invention can be used as a reinforcing or extending filler in organic polymer compositions, such as epoxy resins and phenolic resins, and silicone compositions, such as sealants, adhesives, encapsulants, and conformal coatings.

EXAMPLES

The following examples are presented to further illustrate the coated silicone rubber article and method of the present invention, but are not to be considered as limiting the invention, which is delineated in the appended claims.

Unless otherwise noted, all parts and percentages reported in the examples are by weight. The following methods and materials were employed in the examples:

Preparation of Silicone Rubber Samples

The silicone composition was compression molded using a stainless steel mold (internal dimensions: 12.7×12.7×0.16 cm), a pressure of 5000 psi (34.5 MPa), and the conditions of temperature and time specified in the Examples below.

Measurement of Tensile Strength, Elongation, and Young's Modulus

Tensile strength at rupture (MPa), ultimate elongation (%), and Young's modulus (MPa) of a silicone rubber test specimen were determined according to ASTM Standard D 412–98a using an Instron Model 5500R Tensile Tester and dumbbell-shaped test specimens (4.5×1 cm). Young's modulus was calculated from the stress-strain curve according to ASTM Standard E 111-97. Reported values for tensile strength, elongation, and Young's modulus each represent the average of five measurements made on different silicone test specimens cut from the same silicone rubber sample.

Measurement of Tear Strength

Type B tear strength (kN/mm) of a silicone rubber test specimen was determined according to ASTM Standard D 624-00 an Instron Model 5500R Tensile Tester. Reported values of tear strength represent the average of three measurements made on different test specimens cut from the same silicone rubber sample.

Measurement of Durometer Hardness

The durometer hardness of a silicone rubber test specimen was determined according to ASTM Standard D 2240-02 using a Conveloader Model CV-71200 Shore Type A Durometer. Three test specimens from the same silicone sample were stacked to achieve a total thickness of about 0.5 cm. Reported values for durometer hardness represent the average of three measurements performed at different locations on the same silicone rubber test specimen.

Measurement of Extrusion Rate

The extrusion rate (g/min) of a silicone composition absent the Catalyst and Inhibitor was determined according to ASTM Standard C 1183-91 using a pressure of 90 psi (0.62 MPa).

Measurement of Light Transmittance

The percent transmittance of a silicone rubber test specimen was determined using an XL-211 Hazegard Hazemeter equipped with a tungsten-halogen lamp.

Measurement of Surface Area, Pore Diameter, and Pore Volume

The surface area (m²/g), pore diameter (A), and pore volume (mL/g) of a hydrophobic partially aggregated colloidal silica were determined by nitrogen adsorption using a Micrometrics ASAP 2010 Analyzer.

Analysis of Hydrophobic Partially Aggregated Silica

The extent of surface treatment (% w/w) was determined by digesting samples of the treated silica in the presence of potassium hydroxide and tetraethoxysilane and then analyzing the digest by gas chromatography using a flame ionization detector and an octane internal standard to determine the concentrations of the various silane species. The amount of $SiO_2$ was determined by difference.

Immediately before analysis, the silica sample was dried in an oven at 150° C. for 24 h. After cooling the sample to room temperature, the silica was manually pulverized to eliminate large clumps of silica. Approximately 0.03 to 0.05 g of the treated silica and 0.03 to 0.06 g of octane (internal standard) were combined in a reaction vial. To the mixture was added 4±0.05 g of tetraethyoxysilane and a single pellet of potassium hydroxide. A microscale stir bar was placed in the reaction vial, which was sealed with a rubber septum. A 23-gauge syringe needle (3.8 cm) was inserted through the septum and brought into contact with the bottom of the vial. A 26-gauge syringe needle (0.95 cm) was inserted into the septum to act as a vent needle. Nitrogen was passed through the longer needle at a rate of about 150 mL/min until gas bubbles were no longer observed in the mixture. The vent needle was removed and the vial was pressurized to 10 psi with nitrogen. The vial was placed into an aluminum block at a temperature of 125° C. After stirring the reaction mixture for 1 h, the vial was removed from the aluminum block and then allowed to stand in air for 15 min. The vial was placed in an ice bath for about 10 min during which time the septum was removed from the vial. Dry carbon dioxide was bubbled through the reaction mixture for 3 min, during which time a precipitate formed, indicating neutralization of the base. The mixture was centrifuged at 3000 rpm for 10 min to separate the precipitate from the liquid layer. The pH of the supernatant liquid was measured with pH paper to confirm neutralization of the base (i.e., pH 6 to 8). When the pH was greater than 8, additional carbon dioxide was bubbled through the liquid to complete neutralization. The sample was transferred to a gas chromatography vial for analysis.

Gas Chromatographic analysis was carried out using an Agilent 6890 Gas Chromatograph equipped with a flame ionization detector and a DB-1 capillary column (30 m×250 $\mu$m×1 $\mu$m). The analysis was performed using a split of 50:1, an inlet temperature of 270° C., a detector temperature of 280° C., helium carrier gas at a constant flow of 1.0 mL/min, an internal standard consisting of 20,000 to 30,000 ppm of octane in tetraethoxysilane, and the following temperature profile: hold at 50° C. for 1 min, increase to 200° C. at a rate of 4° C./min, increase to 300° C. at a rate of 20° C./min, and hold at 300° C. for 10 min.

The weight percent of the triorganosiloxane and diorganosiloxane groups on the surface of the treated silica was calculated according to the following equation:

$$\text{wt \%} = \frac{(A)(R_f)(Wt, std)(Purity, std)(10^2)}{(A, std)(R_f, std)(Wt, samp)}$$

where:

$A$ = Area of peak for silicon-containing group, arbitrary units $Wt, std$ = Weight of internal standard (octane), mg $Purity, std$ = Purity of internal standard (octane), wt %

$A, std$ = Area of peak for internal standard (octane), arbitrary units $R_f, std$ = Response factor for internal standard (octane)

-continued

Wt, samp = Weight of sample, mg $$R_f = \frac{(A, std)(R_f, std)(R)(Wt, ref)}{(A,)(Wt, std)(Purity, std)}$$

where:

$$R = \frac{\text{MW of silicon-containing group}}{\text{Mw of reference material (trimethylethoxysilane)}}$$

Wt. Ref = Weight of reference material (trimethylethoxysilane)

The following chemical substances were used in the examples:

Polymer A: a dimethylvinylsiloxy-terminated poly (dimethylsiloxane) having a viscosity of about 55 Pa·s at 25° C.

Polymer B: a dimethylvinylsiloxy-terminated poly (dimethylsiloxane/methylvinylsiloxane) having an average of 145 dimethylsiloxane units and 3 methylvinylsiloxane units per molecule, and a viscosity of 0.35 Pa·s at 25° C.

Cross-linking Agent: a trimethylsiloxy-terminated poly (dimethylsiloxane/methylhydrogen-siloxane) having an average of three dimethylsiloxane units and five methylhydrogensiloxane units per molecule and containing about 0.8% of silicon-bonded hydrogen atoms.

Inhibitor: 1-Ethynyl-1-cylcohexanol.

Catalyst: a mixture consisting of 92% of a dimethylvinylsiloxy-terminated poly (dimethylsiloxane) having a viscosity of about 0.45 Pa·s at 25° C., 7% of 1,3-divinyl-1,1,3,3-tetramethyldisiloxane, and 1% of platinum complex of 1,3-divinyltetramethyldisiloxane.

Silica Filler A: an aqueous suspension of colloidal silica sold under the trade name SNOWTEX-PS-S by Nissan Chemical Industries (Tokyo, Japan). The suspension consists of 13% (w/w) of amorphous silica ($SiO_2$), less than 0.2% (w/w) of $Na_2O$, and water. The suspension has a viscosity of 10 mPa·s at 25° C., a pH of 10.1, a specific gravity of 1.08 at 20° C., and a particle size of about 125 nm (dynamic light-scattering method).

Silica Filler B: an aqueous suspension of colloidal silica sold under the trade name SNOWTEX-PS-M by Nissan Chemical Industries (Tokyo, Japan). The suspension consists of 21% (w/w) of amorphous silica ($SiO_2$), less than 0.2% (w/w) of $Na_2O$, and water. The suspension has a viscosity of 9 mPa·s at 25° C., a pH of 9.7 a specific gravity of 1.14 at 20° C., and a particle size of about 127 nm (dynamic light-scattering method).

Silica Filler C: an aqueous suspension of colloidal silica sold under the trade name SNOWTEX-UP by Nissan Chemical Industries (Tokyo, Japan). The mixture consists of 20% (w/w) of amorphous silica ($SiO_2$), less than 0.35% (w/w) of $Na_2O$, and water. The suspension has a viscosity of 12.5 mPa·s at 25° C., a pH of about 10.4, and a specific gravity of 1.13 at 20° C.

Example 1

Concentrated hydrochloric acid (300 mL), 1 L of deionized water, 750 mL of 2-propanol, 300 mL of hexamethyldisiloxane, and 20 mL of 1,3-divinyltetramethyldisiloxane were combined in a 5-L flask equipped with a mechanical stirrer. Silica Filler A (1 L) was slowly added to the flask during a period of 30 min. The resulting suspension was stirred at 75° C. for 2 h, during which time the hydrophobic colloidal silica separated from the aqueous phase. The aqueous phase was removed and the remaining hydrophobic colloidal silica was washed with 1 L of a solution of isopropanol (25 v/v %) in deionized water. The aqueous wash was removed and the washing procedure was repeated. After the second wash was removed, 2.5 L of toluene was added to the flask. The flask was fitted with a Dean-Stark trap and the suspension was distilled until the distillate was free of water. The suspension was spray-dried in a Buchi B-191 Mini Spray Drier using compressed nitrogen, an aspirator setting of 50%, a pump setting of 50%, an inlet temperature of 220° C., and an outlet temperature of 140° C., to produce 120 g of hydrophobic partially aggregated colloidal silica. The physical properties and composition of the hydrophobic colloidal silica are shown in Table 1. An electron micrograph (TEM, magnification 100,000) of the hydrophobic partially aggregated colloidal silica is shown in FIG. 1.

Example 2

A hydrophobic partially aggregated colloidal silica was prepared using the method of Example 1, except the volume of hexamethyldisiloxane was 305 mL and the volume of 1,3-divinyltetramethyldisiloxane was 30 mL. The yield of hydrophobic colloidal silica was 120 g. The physical properties and composition of the hydrophobic colloidal silica are shown in Table 1.

Example 3

A hydrophobic partially aggregated colloidal silica was prepared using the method of Example 1, except the volume of 1,3-divinyltetramethyldisiloxane was 35 mL. The yield of hydrophobic colloidal silica was 120 g. The physical properties and composition of the hydrophobic colloidal silica are shown in Table 1.

Example 4

A hydrophobic partially aggregated colloidal silica was prepared using the method of Example 1, except the volume of concentrated HCl was 200 mL, the volume of deionized water was 900 mL, 150 mL of chlorotrimethylsilane was used in place of hexamethyldisiloxane and 15 mL of chlorodimethylvinylsilane was used in place of 1,3-divinyltetramethyldisiloxane. The yield of hydrophobic colloidal silica was 51 g. The physical properties and composition of the hydrophobic colloidal silica are shown in Table 1.

Example 5

Concentrated hydrochloric acid (200 mL), 0.9 L of deionized water, 750 mL of 2-propanol, 150 mL of chlorotrimethylsilane, 10 mL of chlorodimethylvinylsilane, 10 mL of chloromethylphenylvinylsilane, 10 mL of chlorodimethylphenylsilane, and 10 mL of chlorodiphenylmethylsilane were combined in a 5-L flask. Silica Filler A (1 L) was slowly added to the flask during a period of 30 min. The resulting suspension was stirred at 75° C. for 1 h and then at room temperature overnight. Toluene (500 mL) was added to the flask to effect separation of the hydrophobic colloidal silica from the aqueous phase. The aqueous phase was removed and the remaining suspension of hydrophobic colloidal silica was washed with 1 L of a solution of isopropanol (25 v/v %) in deionized water. The aqueous wash was removed, the flask was fitted with a Dean-Stark trap, and the suspension was distilled until the distillate was free of water. The suspension was spray-dried in a Buchi B-191 Mini Spray Drier using compressed nitrogen, an aspirator setting of 50%, a pump setting of 50%, an inlet temperature of 220° C., and an outlet temperature of 140° C., to produce 114 g of hydrophobic partially aggregated colloidal silica. The physical properties and composition of the hydrophobic colloidal silica are shown in Table 1. The weight percent of phenyl-containing organosiloxy groups was not determined.

Example 6

Water (1 L), 750 mL of 2-propanol, and 300mL of concentrated hydrochloric acid were combined in a 5-L flask equipped with a mechanical stirrer. Silica Filler A (1 L) was slowly to the flask during a period of 30 min. Simultaneously, a mixture of 313 mL of dichlorodimethylsilane and 30.5 mL dichloromethylvinylsilane was added slowly to the flask during the same 30-min period. The resulting suspension was stirred at 75° C. for 2 h, during which time the hydrophobic colloidal silica separated from the aqueous phase. The aqueous phase was removed, 1 L of a solution of 2-propanol (33 v/v %) in deionized water was added to the flask, and the mixture was rapidly stirred for 1 min. The aqueous wash was removed and the washing procedure was repeated. After the second wash was removed, 2 L of toluene was added to the flask. The flask was fitted with a Dean-Stark trap, and the suspension was distilled until the distillate was free of water. The suspension was spray-dried in a Buchi B-191 Mini Spray Drier using compressed nitrogen, an aspirator setting of 50%, a pump setting of 50%, an inlet temperature of 220° C., and an outlet temperature of 140° C., to produce 225 g of hydrophobic partially aggregated colloidal silica. The physical properties and composition of the hydrophobic colloidal silica are shown in Table 1.

Example 7

A mixture consisting of 562.7 mL of water, 750 mL of 2-propanol, 300 mL of hexamethyldisiloxane, and 300 mL of concentrated hydrochloric acid was added to 1043.5 g of Silica Filler A (diluted with water to 10% w/w $SiO_2$) in a 5-L flask equipped with a mechanical stirrer. After stirring for one hour at 75° C., the aqueous solution was allowed to cool to room temperature. Methyl isobutyl ketone (500 mL) was added to the stirred mixture to effect separation of the hydrophobic colloidal silica from the aqueous phase, which was then removed. Methyl isobutyl ketone (100 ml,) and 500 mL of a solution of 2-propanol (33% v/v) and water were added to the flask, followed by removal of the aqueous phase. The preceding step was repeated using 150 mL of methyl isobutyl ketone and 500 mL of the solution of 2-propanol and water. After the aqueous phase was removed, 1500 mL of methyl isobutyl ketone was added to the flask. The flask was fitted with a Dean-Stark trap and the suspension was distilled until the distillate was free of water. The remaining slurry was poured into a 18×25-cm Pyrex evaporating dish and the solvent was allowed to evaporate overnight. The hydrophobic colloidal silica was further dried in an air-circulating oven at 150° C. for 23 hours. The physical properties and composition of the hydrophobic colloidal silica are shown in Table 1.

Example 8

Concentrated HCl (300 mL), 1 L of deionized water, 750 mL of 2-propanol, 300 mL of hexamethyldisiloxane, and 20 mL of 1,3-divinyltetramethyldisiloxane were combined in a 5-L flask. Silica Filler B (700 mL) was slowly added to the flask during a period of 50 min. The resulting suspension was stirred at 75° C. for 1 h, during which time the hydrophobic colloidal silica separated from the aqueous phase. The aqueous phase was removed and the remaining hydrophobic colloidal silica was washed with 1 L of a solution of 2-propanol (25 v/v %) in deionized water. The aqueous wash was removed and the washing procedure was repeated. After the second wash was removed, 2.6 L of toluene was added to the flask. The flask was fitted with a Dean-Stark trap, and the suspension was distilled until the distillate was free of water. The suspension was spray-dried in a Buchi B-191 Mini Spray Drier using compressed nitrogen, an aspirator setting of 50%, a pump setting of 50%, an inlet temperature of 220° C., and an outlet temperature of 140° C., to produce 70 g of hydrophobic partially aggregated colloidal silica. The physical properties and composition of the hydrophobic colloidal silica are shown in Table 1.

Example 9

A mixture consisting of 1300 mL of concentrated hydrochloric acid, 200 mL of chlorotrimethylsilane and 10 mL of chlorodimethylvinylsilane was added to 400 mL of Silica Filler B in a 5-L flask equipped with a mechanical stirrer. The resulting suspension was stirred at 63° C. for 1 h, during which time the hydrophobic colloidal silica separated from the aqueous phase. The aqueous phase was removed, 1 L of deionized water was added to the flask, and the reaction mixture was rapidly stirred for 1 min. The aqueous phase was removed and 500 mL of toluene was added to the flask. The flask was fitted with a Dean-Stark trap, and the suspension was distilled until the distillate was free of water. The remaining toluene/xerogel slurry was poured into a 18×25-cm Pyrex evaporating dish and the solvent was allowed to evaporate overnight. The silica was further dried in an air-circulating oven at 120° C. for 10 hours. The physical properties and composition of the hydrophobic colloidal silica are shown in Table 1.

Example 10

Concentrated hydrochloric acid (300 mL), 1 L of deionized water, 750 mL of 2-propanol, 300 mL of hexamethyldisiloxane, and 20 mL of 1,3-divinyltetramethyldisiloxane were combined in a 5-L flask. A mixture consisting of Silica Filler A (720 mL) and 265 mL of Silica Filler B was slowly added to the flask during a period of 30 minutes. The resulting suspension was stirred at 75° C. for 2 h, during which time the hydrophobic colloidal silica separated from the aqueous phase. The aqueous phase was removed and the hydrophobic colloidal silica was washed with 1 L of a solution of 2-propanol (25 v/v %) in deionized water. The aqueous wash was removed and 2.7 L of toluene was added to the flask. The flask was fitted with a Dean-Stark trap, and the suspension was distilled until the distillate was free of water. The suspension was spray-dried in a Buchi B-191 Mini Spray Drier using compressed nitrogen, an aspirator setting of 50%, a pump setting of 50%, an inlet temperature of 220° C., and an outlet temperature of 140° C., to produce 110 g of hydrophobic partially aggregated colloidal silica. The physical properties and composition of the hydrophobic colloidal silica are shown in Table 1.

Example 11

Concentrated hydrochloric acid (300 mL), 1 L of deionized water, 750 mL of 2-propanol, 300 mL of hexamethyldisiloxane, and 15 mL of 1,3-divinyltetramethyldisiloxane were combined in a 5-L flask. A mixture consisting of Silica Filler A (250 mL) and 500 mL of Silica Filler B was slowly added to the flask during a period of 60 minutes. The resulting suspension was stirred at 75° C. for 2 h, during which time the hydrophobic colloidal silica separated from the aqueous phase. The aqueous phase was removed and the hydrophobic colloidal silica was washed with 500 mL of a solution of 2-propanol (40 v/v %) in deionized water. The aqueous wash was removed and the washing procedure was repeated. After the second wash was removed, 2.5 L of toluene was added to the flask. The flask was fitted with a Dean-Stark trap, and the suspension was distilled until the distillate was free of water. The suspension was spray-dried in a Buchi B-191 Mini Spray Drier using compressed nitrogen, an aspirator setting of 50%, a pump setting of 50%, an inlet temperature of 220° C., and an outlet temperature of 140° C., to produce 45 g of hydrophobic partially aggregated colloidal silica. The physical properties and composition of the hydrophobic colloidal silica are shown in Table 1.

Example 12

Concentrated HCl (300 mL), 1 L of deionized water, 750 mL of 2-propanol, 300 mL of hexamethyldisiloxane, and 20 mL of 1,3-divinyltetramethyldisiloxane were added to a 5-L flask. Silica filler C (680 mL) was slowly added to the flask during a period of 50 min. The resulting suspension was stirred at 75° C. for 1 h, during which time the hydrophobic colloidal silica separated from the aqueous phase. The aqueous phase was removed and the hydrophobic colloidal silica was washed with 1 L of a solution of 2-propanol (25 v/v %) in deionized water. The aqueous wash was removed and the washing procedure was repeated. After the second wash was removed, 2.6 L of toluene was added to the flask. The flask was fitted with a Dean-Stark trap and the suspension was distilled until the distillate was free of water. The suspension was spray-dried in a Buchi B-191 Mini Spray Drier using compressed nitrogen, an aspirator setting of 50%, a pump setting of 50%, an inlet temperature of 220° C., and an outlet temperature of 140° C., to produce 105 g of hydrophobic partially aggregated colloidal silica. The physical properties and composition of the hydrophobic colloidal silica are shown in Table 1.

Example 13

A mixture consisting of 1 L of concentrated hydrochloric acid, 100 mL of chlorotrimethylsilane, and 5 mL chlorodimethylvinylsilane was added to 250 mL of Silica Filler C. The resulting suspension was stirred at 60° C. for 1 h, during which time the hydrophobic colloidal silica separated from the aqueous phase. The aqueous phase was removed, 500 mL of deionized water was added to the flask, and the mixture was rapidly stirred for 1 min. The aqueous wash was removed, 610 mL of deionized water was added to the flask, and the mixture was rapidly stirred for 1 min. The aqueous wash was removed, 1 L of water was added to the flask, and the mixture was stirred rapidly for 1 min. The aqueous wash was removed and 1 L of toluene was added to the flask. The flask was fitted with a Dean-Stark trap and the suspension was distilled until the distillate was free of water. The remaining slurry was poured into a 18×25-cm Pyrex evaporating dish and the solvent was allowed to evaporate overnight. The treated silica was further dried in an air-circulating oven at 120° C. for 19 hours. The physical properties and composition of the hydrophobic colloidal silica are shown in Table 1.

TABLE 1

| | | | | Analysis of Hydrophobic Silica, Wt % | | | | |
|---|---|---|---|---|---|---|---|---|
| Example | Surface Area (m²/g) | Pore Diam. (Å) | Pore Vol. (mL/g) | $Me_3SiO_{1/2}$ | $Me_2ViSiO_{1/2}$ | $Me_2SiO$ | $MeViSiO$ | $MeSiO_{3/2}$ |
| 1 | 132 | 222 | 1.09 | 4.07 | 0.21 | 0.13 | 0.00 | 0.02 |
| 2 | 143 | 144 | 0.52 | 3.68 | 0.54 | 0.33 | 0.00 | 0.02 |
| 3 | 158 | 214 | 1.15 | 4.05 | 0.35 | 0.14 | 0.00 | 0.01 |
| 4 | 146 | 250 | 1.2 | 4.14 | 0.34 | 0.28 | 0.00 | 0.02 |
| 5 | 142 | 181 | 1.01 | 4.11 | 0.22 | 0.35 | 0.01 | 0.03 |
| 6 | 33 | 274 | 0.19 | 0.01 | 0.00 | 36.78 | 3.94 | 0.18 |
| 7 | 178 | 157 | 0.99 | 4.39 | 0.00 | 0.03 | 0.00 | 0.00 |
| 8 | 81 | 283 | 0.69 | 2.62 | 0.14 | 0.10 | 0.00 | 0.01 |
| 9 | 96 | 238 | 0.74 | 3.50 | 0.13 | 0.27 | 0.00 | 0.01 |
| 10 | 116 | 252 | 1.03 | 3.51 | 0.19 | 0.08 | 0.00 | 0.01 |
| 11 | 102 | 213 | 0.58 | 3.10 | 0.11 | 0.09 | 0.00 | 0.01 |
| 12 | 173 | 101 | 0.72 | 5.49 | 0.27 | 0.12 | 0.00 | 0.01 |
| 13 | 198 | 70.7 | 0.59 | 8.31 | 0.29 | 0.28 | 0.00 | 0.00 |

Example 14

A silicone composition was prepared by first adding the hydrophobic colloidal silica of Example 1 to a mixture consisting of 90% of Polymer A and 10% of Polymer B in an amount sufficient to achieve a concentration of 28% (w/w), based on the weight of the final silicone composition. The silica was added to the mixture at a rate of 1 g/min in a Haake Rheocord System 90 Mixer equipped with a Rheomix 600 mixing head with sigma mixing blades operating at 50 rpm. After the addition was complete, the mixture was mixed at 60° C. for 1 h and then allowed to cool to 40° C. during a period of 20 min. Crosslinking Agent was added to the mixture in an amount sufficient to provide 1.5 silicon-bonded hydrogen atoms per vinyl group in Polymer-A and Polymer B combined, to produce a silicone base. After mixing for 30 min, 0.15 mL of Inhibitor was added to the silicone base. Catalyst was then added to the mixture in sufficient amount to provide from 10 to 15 ppm of platinum metal, based on the weight of the final silicone composition. The extrusion rate of the silicone base was 61 g/min.

Examples 15a and 15b

In Example 15a, a sample of the silicone composition of Example 14 was compression molded under a continuous pressure of 34.5 MPa at room temperature for 3 to 5 min and 150° C. for 10 min. In Example 15b, a sample of the silicone composition of Example 14 was compression molded under a continuous pressure of 34.5 MPa at room temperature for 3 to 5 min, 150° C. for 10 min, and 200° C. for 1 h. The physical properties of the silicone rubber products are shown in Table 2.

Example 16

A silicone composition was prepared using the method of Example 14, except the hydrophobic colloidal silica of Example 1 was replaced with 28% (w/w) of the hydrophobic colloidal silica of Example 2. The extrusion rate of the silicone base was 45 g/min.

Examples 17a and 17b

In Example 17a, a sample of the silicone composition of Example 16 was compression molded under a continuous pressure of 34.5 MPa at room temperature for 3 to 5 min and 150° C for 10 min. In Example 17b, a sample of the silicone composition of Example 16 was compression molded under a continuous pressure of 34.5 MPa at room temperature for 3 to 5 min, 150° C. for 10 min, and 200° C. for 1 h. The physical properties of the silicone rubber products are shown in Table 2.

Example 18

A silicone composition was prepared using the method of Example 14, except the hydrophobic colloidal silica of Example 1 was replaced with 30% (w/w) of the hydrophobic colloidal silica of Example 3. The extrusion rate of the silicone base was 44 g/min.

Examples 19a and 19b

In Example 19a, a sample of the silicone composition of Example 18 was compression molded under a continuous pressure of 34.5 MPa at room temperature for 3 to 5 min and 150° C. for 10 min. In Example 19b, a sample of the silicone composition of Example 18 was compression molded under a continuous pressure of 34.5 MPa at room temperature for 3 to 5 min, 150° C. for 10 min, and 200° C. for 1 h. The physical properties of the silicone rubber products are shown in Table 2.

Example 20

A silicone composition was prepared using the method of Example 14, except the hydrophobic colloidal silica of Example 1 was replaced with 30% (w/w) of the hydrophobic colloidal silica of Example 4. The extrusion rate of the silicone base was 52 g/min.

Examples 21a and 21b

In Example 21a, a sample of the silicone composition of Example 20 was compression molded under a continuous pressure of 34.5 MPa at room temperature for 3 to 5 min and 150° C. for 10 min. In Example 21b, a sample of the silicone composition of Example 20 was compression molded under a continuous pressure of 34.5 MPa at room temperature for 3 to 5 min, 150° C. for 10 min, and 200° C. for 1 h. The physical properties of the silicone rubber products are shown in Table 2.

Example 22

A silicone composition was prepared using the method of Example 14, except the hydrophobic colloidal silica of Example 1 was replaced with 34% (w/w) of the hydrophobic colloidal silica of Example 5. The extrusion rate of the silicone base was 59 g/min.

Examples 23a and 23b

In Example 23a, a sample of the silicone composition of Example 22 was compression molded under a continuous pressure of 34.5 MPa at room temperature for 3 to 5 min and 150° C. for 10 min. In Example 23b, a sample of the silicone composition of Example 22 was compression molded under a continuous pressure of 34.5 MPa at room temperature for 3 to 5 min, 150° C. for 10 min, and 200° C. for 1 h. The physical properties of the silicone rubber products are shown in Table 2.

Example 24

A silicone composition was prepared using the method of Example 14, except the hydrophobic colloidal silica of Example 1 was replaced with 30% (w/w) of the hydrophobic colloidal silica of Example 6. The extrusion rate of the silicone base was 110 g/min.

Examples 25a and 25b

In Example 25a, a sample of the silicone composition of Example 24 was compression molded under a continuous pressure of 34.5 MPa at room temperature for 3 to 5 min and 150° C. for 10 min. In Example 25b, a sample of the silicone composition of Example 24 was compression molded under a continuous pressure of 34.5 MPa at room temperature for 3 to 5 min, 150° C. for 10 min, and 200° C. for 1 h. The physical properties of the silicone rubber products are shown in Table 2.

Example 26

A silicone composition was prepared using the method of Example 14, except the hydrophobic colloidal silica of Example 1 was replaced with 25% (w/w) of the hydrophobic colloidal silica of Example 7 and the mixture of Polymer A, Polymer B, and hydrophobic colloidal silica was mixed at room temperature for 1 h instead of 60° C. for 1 h, immediately before addition of the Cross-linking Agent.

Examples 27a and 27b

In Example 27a, a sample of the silicone composition of Example 26 was compression molded under a continuous pressure of 34.5 MPa at room temperature for 3 to 5 min and 150° C. for 10 min. In Example 27b, a sample of the silicone composition of Example 26 was compression molded under a continuous pressure of 34.5 MPa at room temperature for 3 to 5 min, 150° C. for 10 min, and 200° C. for 1 h. The physical properties of the silicone rubber products are shown in Table 2.

Example 28

A silicone composition was prepared using the method of Example 14, except the hydrophobic colloidal silica of Example 1 was replaced with 34% (w/w) of the hydrophobic colloidal silica of Example 8. The extrusion rate of the silicone base was 84 g/min.

Examples 29a and 429b

In Example 29a, a sample of the silicone composition of Example 28 was compression molded under a continuous pressure of 34.5 MPa at room temperature for 3 to 5 min and 150° C. for 10 min. In Example 29b, a sample of the silicone composition of Example 28 was compression molded under a continuous pressure of 34.5 MPa at room temperature for 3 to 5 min, 150° C. for 10 min, and 200° C. for 1 h. The physical properties of the silicone rubber products are shown in Table 2.

Example 30

A silicone composition was prepared using the method of Example 14, except the hydrophobic colloidal silica of Example 1 was replaced with 34% (w/w) of the hydrophobic colloidal silica of Example 9.

Example 31a and 31b

In Example 31a, a sample of the silicone composition of Example 30 was compression molded under a continuous pressure of 34.5 MPa at room temperature for 3 to 5 min and 150° C. for 10 min. In Example 31b, a sample of the silicone composition of Example 30 was compression molded under a continuous pressure of 34.5 MPa at room temperature for 3 to 5 min, 150° C. for 10 min, and 200° C. for 1 h. The physical properties of the silicone rubber products are shown in Table 2.

Example 32

A silicone composition was prepared using the method of Example 14, except the hydrophobic colloidal silica of Example 1 was replaced with 30% (w/w) of the hydrophobic colloidal silica of Example 10. The extrusion rate of the silicone base was 68 g/min.

Examples 33a and 33b

In Example 33a, a sample of the silicone composition of Example 32 was compression molded under a continuous pressure of 34.5 MPa at room temperature for 3 to 5 min and 150° C. for 10 min. In Example 33b, a sample of the silicone composition of Example 32 was compression molded under a continuous pressure of 34.5 MPa at room temperature for 3 to 5 min, 150° C. for 10 min, and 200° C. for 1 h. The physical properties of the silicone rubber products are shown in Table 2.

Example 34

A silicone composition was prepared using the method of Example 14, except the hydrophobic colloidal silica of Example 1 was replaced with 25% (w/w) of the hydrophobic colloidal silica of Example 11. The extrusion rate of the silicone base was 150 g/min.

Examples 35a and 35b

In Example 35a, a sample of the silicone composition of Example 34 was compression molded under a continuous pressure of 34.5 MPa at room temperature for 3 to 5 min and 150° C. for 10 min. In Example 35b, a sample of the silicone composition of Example 34 was compression molded under a continuous pressure of 34.5 MPa at room temperature for 3 to 5 min, 150° C. for 10 min, and 200° C. for 1 h. The physical properties of the silicone rubber products are shown in Table 2.

Example 36

A silicone composition was prepared using the method of Example 14, except the hydrophobic colloidal silica of Example 1 was replaced with 30% (w/w) of the hydrophobic colloidal silica of Example 12. The extrusion rate of the silicone base was 163 g/min.

Examples 37a and 37b

In Example 37a, a sample of the silicone composition of Example 36 was compression molded under a continuous pressure of 34.5 MPa at room temperature for 3 to 5 min and 150° C. for 10 min. In Example 37b, a sample of the silicone composition of Example 36 was compression molded under a continuous pressure of 34.5 MPa at room temperature for 3 to 5 min, 150° C. for 10 min, and 200° C. for 1 h. The physical properties of the silicone rubber products are shown in Table 2.

Example 38

A silicone composition was prepared using the method of Example 14, except the hydrophobic colloidal silica of Example 1 was replaced with 39% (w/w) of the hydrophobic colloidal silica of Example 13.

Examples 39a and 39b

In Example 39a, a sample of the silicone composition of Example 38 was compression molded under a continuous pressure of 34.5 MPa at room temperature for 3 to 5 min and 150° C. for 10 min. In Example 39b, a sample of the silicone composition of Example 38 was compression molded under a continuous pressure of 34.5 MPa at room temperature for 3 to 5 min, 150° C. for 10 min, and 200° C. for 1 h. The physical properties of the silicone rubber products are shown in Table 2.

TABLE 2

| Example | Durometer Hardness (Shore A) | Tensile Strength (MPa) | Elongation (%) | Young's Modulus (MPa) at Elongation = | | | Tear Strength (N/mm) | Light Trans. (%) |
|---|---|---|---|---|---|---|---|---|
| | | | | 50% | 100% | 200% | | |
| 15a | 42 | 5.18 | 437 | 0.71 | 1.33 | 2.25 | 40.63 | 85 |
| 15b | 47 | 5.99 | 499 | 1.17 | 1.90 | 2.94 | — | 79 |
| 17a | 48 | 5.13 | 406 | 1.09 | 1.79 | 2.88 | — | 83 |
| 17b | 50 | 4.95 | 365 | 1.22 | 1.98 | 3.14 | 33.27 | 79 |
| 19a | 45 | 4.96 | 463 | 0.92 | 1.72 | 2.81 | 41.51 | 82 |
| 19b | 51 | 5.25 | 364 | 1.37 | 2.18 | 3.38 | — | 82 |
| 21a | 42 | 5.20 | 530 | 0.94 | 1.51 | 2.39 | 36.60 | 82 |
| 21b | 48 | 5.78 | 460 | 1.24 | 1.92 | 2.99 | — | 79 |
| 23a | 49 | 6.12 | 500 | 1.10 | 1.91 | 3.14 | 39.58 | 79 |
| 23b | 49 | 6.57 | 527 | 1.32 | 2.08 | 3.28 | — | 78 |
| 25a | 16 | 0.32 | 82 | 0.28 | — | — | — | 70 |
| 25b | 19 | 0.37 | 75 | 0.38 | — | — | 0.88 | 73 |
| 27a | 40 | 4.27 | 481 | 0.74 | 1.25 | 2.11 | — | 86 |
| 27b | 42 | 4.60 | 421 | 0.92 | 1.54 | 2.57 | — | 86 |
| 29a | 41 | 5.67 | 651 | 0.77 | 1.23 | 2.01 | 36.08 | 78 |
| 29b | 43 | 6.54 | 574 | 0.95 | 1.51 | 2.48 | | 72 |
| 31a | 47 | 6.01 | 586 | 0.91 | 1.41 | 2.39 | — | 79 |
| 31b | 50 | 5.03 | 408 | 1.05 | 1.64 | 2.79 | — | 78 |
| 33a | 42 | 6.16 | 567 | 0.88 | 1.52 | 2.55 | 42.03 | 82 |
| 33b | 45 | 5.52 | 441 | 1.10 | 1.83 | 2.99 | — | 76 |
| 35a | 38 | 4.33 | 440 | 0.60 | 1.09 | 2.00 | — | — |
| 35b | 39 | 4.81 | 438 | 0.57 | 1.12 | 2.14 | 23.64 | 78 |

TABLE 2-continued

| Example | Durometer Hardness (Shore A) | Tensile Strength (MPa) | Elongation (%) | Young's Modulus (MPa) at Elongation = | | | Tear Strength (N/mm) | Light Trans. (%) |
| --- | --- | --- | --- | --- | --- | --- | --- | --- |
| | | | | 50% | 100% | 200% | | |
| 37a | 37 | 2.75 | 285 | 0.85 | 1.42 | 2.30 | 15.24 | 86 |
| 37b | 42 | 3.14 | 248 | 1.25 | 1.90 | 2.90 | — | 79 |
| 39a | 53 | 4.78 | 405 | 1.30 | 2.17 | — | — | 87 |
| 39b | 56 | 4.62 | 350 | 1.41 | 2.34 | — | — | 85 |

— denotes the property was not measured

That which is claimed is:

1. A method of preparing a hydrophobic partially aggregated colloidal silica, the method comprising reacting (a) a silica sol comprising at least one hydrophilic partially aggregated colloidal silica with (b) an organosilicon compound selected from (i) at least one organosilane having the formula $R^1{}_aH_bSiX_{4-a-b}$, (ii) at least one organocyclosiloxane having the formula $(R^1{}_2SiO)_m$, (iii) at least one organosiloxane having the formula $R^1{}_3SiO(R^1SiO)_nSiR^1{}_3$, and (iv) a mixture comprising at least two of (i) (ii), and (iii), in the presence of (c) water (d) an effective amount of a water-miscible organic solvent, and (e) an acid catalyst, to produce the hydrophobic partially aggregated colloidal silica and an aqueous phase, wherein $R^1$ is hydrocarbyl or substituted hydrocarbyl; X is a hydrolysable group; a is 0, 1, 2, or 3; b is 0 or 1; a+b=1, 2, or 3, provided when b=1, a+b=2 or 3; m has an average value of from 3 to 10; and n has an average value of from 0 to 10.

2. The method according to claim 1, wherein component (a) is a moniliform silica sol.

3. The method according to claim 1, wherein component (a) is an elongated-shaped silica sol.

4. The method according to claim 1, wherein X is selected from —Cl, Br, —OR$^3$, —OCH$_2$CH$_2$OR$^3$, CH$_3$C(=O)O—, Et(Me)C=N—O—, CH$_3$C(=O)N(CH$_3$)—, and —ONH$_2$, wherein R$^3$ is C$_1$ to C$_8$ hydrocarbyl or halogen-substituted hydrocarbyl.

5. The method according to claim 1, wherein m has an average value of from 3 to 5.

6. The method according to claim 1, wherein n has an average value of from 0 to 4.

7. The method according to claim 1, wherein component (d) is a monohydric alcohol.

8. The method according to claim 1, wherein the concentration of the hydrophilic partially aggregated colloidal silica of component (a) is from 1 to 20% (w/w).

9. The method according to claim 1, wherein the mole ratio of component (b) to the SiO$_2$ in component (a) is from 0.1 to 5.

10. The method according to claim 1, wherein the concentration of water is from 20 to 60% (w/w).

11. The method according to claim 1, wherein the concentration of component (d) is from 5 to 35% (w/w).

12. The method according to claim 1, wherein the hydrophobic partially aggregated colloidal silica precipitates from the aqueous phase.

13. The method according to claim 12, further comprising separating the hydrophobic partially aggregated colloidal silica from the aqueous phase.

14. The method according to claim 13, further comprising washing the hydrophobic partially aggregated colloidal silica with water.

15. The method according to claim 14, further comprising suspending the hydrophobic partially aggregated colloidal silica in a water-immiscible organic solvent.

16. The method according to claim 15, wherein the water-immiscible organic solvent forms a minimum boiling azeotrope with water.

17. The method according to claim 15, further comprising removing the water-immiscible organic solvent by evaporating or spray drying.

18. The method according to claim 17, further comprising before removing the water-immiscible organic solvent, distilling the suspension of the hydrophobic partially aggregated colloidal silica to remove water.

19. The method according to claim 1, wherein the hydrophobic partially aggregated colloidal silica remains suspended in the aqueous phase.

20. The method according to claim 19, further comprising treating the aqueous suspension with a water-immiscible organic solvent in an amount sufficient to form a non-aqueous phase comprising the water-immiscible organic solvent and the hydrophobic partially aggregated colloidal silica.

21. The method according to claim 20, wherein the water-immiscible organic solvent forms a minimum boiling azeotrope with water.

22. The method according to claim 20, further comprising separating the non-aqueous phase from the aqueous phase.

23. The method according to claim 22, further comprising washing the non-aqueous phase with water.

24. The method according to claim 23, further comprising removing the water-immiscible organic solvent by evaporating or spray drying.

25. The method according to claim 24, further comprising before removing the water-immiscible organic solvent, distilling the non-aqueous phase to remove water.

26. The hydrophobic partially aggregated colloidal silica prepared by the method of claim 1.

27. The hydrophobic partially aggregated colloidal silica prepared by the method of claim 12.

28. The hydrophobic partially aggregated colloidal silica prepared by the method of claim 18.

29. The hydrophobic partially aggregated colloidal silica prepared by the method of claim 19.

30. The hydrophobic partially aggregated colloidal silica prepared by the method of claim 25.

* * * * *

UNITED STATES PATENT AND TRADEMARK OFFICE
CERTIFICATE OF CORRECTION

PATENT NO. : 6,830,811 B2
DATED : December 14, 2004
INVENTOR(S) : Timothy Chi-Shan Chao It is certified that error appears in the above-identified patent and that said Letters Patent is hereby corrected as shown below:

Title page,
Below Item [57], ABSTRACT, the phrase "30 Claims, 1 Drawing Sheet" should be read -- 30 Claims --.

Drawings,
Fig. 1 should be deleted in its entirety.

Column 2,
Lines 56-60, the heading and the text should be deleted.

Column 14,
Lines 18-20, "An electron micrograph (TEM, magnification 100,000) of the hydrophobic partially aggregated colloidal silica is shown in Figure 1." should be deleted.

Signed and Sealed this

Twenty-seventh Day of September, 2005

JON W. DUDAS
*Director of the United States Patent and Trademark Office*